INVENTOR.
ROBERT P. DUMM,
BY
ATTORNEY.

Sept. 11, 1962    R. P. DUMM    3,053,498
CLUTCH HAND WHEEL FOR A SOFT SEAT VALVE
Filed Dec. 12, 1960    2 Sheets-Sheet 2
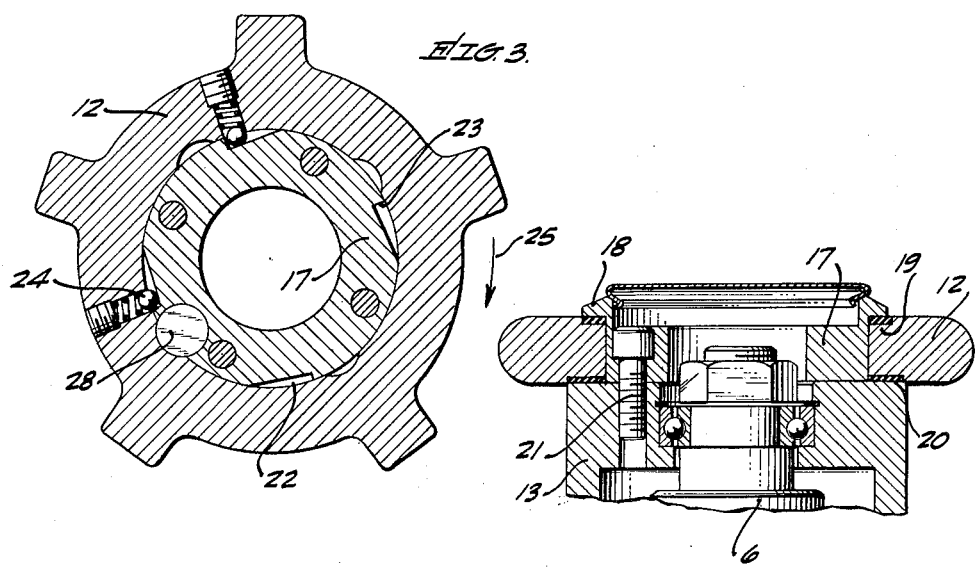
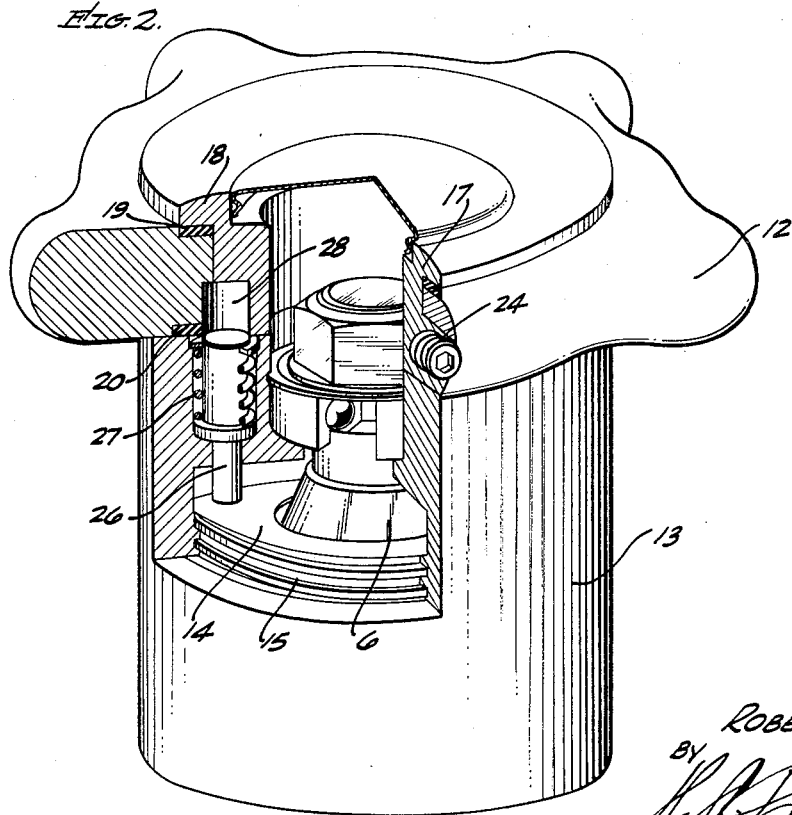
INVENTOR.
ROBERT P. DUMM,
BY
ATTORNEY.

United States Patent Office 3,053,498
Patented Sept. 11, 1962

3,053,498
CLUTCH HAND WHEEL FOR A SOFT SEAT VALVE
Robert P. Dumm, Long Beach, Calif., assignor to Pacific Valves, Inc., Long Beach, Calif., a corporation of California
Filed Dec. 12, 1960, Ser. No. 75,160
11 Claims. (Cl. 251—81)

This invention relates to a hand wheel for a soft seat valve in which a clutch is incorporated to insure that the soft seat will not be injured by exerting too great a pressure thereon when closing the valve. In the type of valve herein considered a relatively small pressure is all that is required to effectively seat the valve in closed position, and any greater pressure than the maximum required for seating would injure the material of the seat and thus causing the valve to leak, even though a proper pressure were applied. In the type of valve here under consideration, a force of about 30 pounds is all that is required to seat the valve against a pressure of 6,000 pounds.

An object of my invention is to provide a novel clutch construction for the hand wheel which closes and opens the valve; the clutch being operable to disengage when a fixed maximum pressure is exerted on the hand wheel, and to provide a positive engagement for the valve in the opening position to permit an opening force somewhat greater than the closing force, if this should be required.

Another object of my invention is to provide a novel clutch hand wheel for soft seat valves of the character stated, in which the clutching action of the hand wheel is operable during only part of the vertical stroke of the seat of the valve, namely, when the seat is in closed position.

Still another means is to provide a novel means of frictionally connecting the hand wheel and the seat actuating mechanism; this frictional connection acting as an additional clutch connection between the parts.

Other objects, advantages and features of my invention may appear from the accompanying drawings, the subjoined detailed description and the appended claims.

In the Drawing

FIGURE 2 is a perspective view of the clutch hand wheel construction with parts broken away to show interior construction.

FIGURE 3 is a horizontal sectional view taken on line 3—3 of FIGURE 1.

FIGURE 4 is a fragmentary vertical sectional view of the clutch hand wheel.

Figure 1:
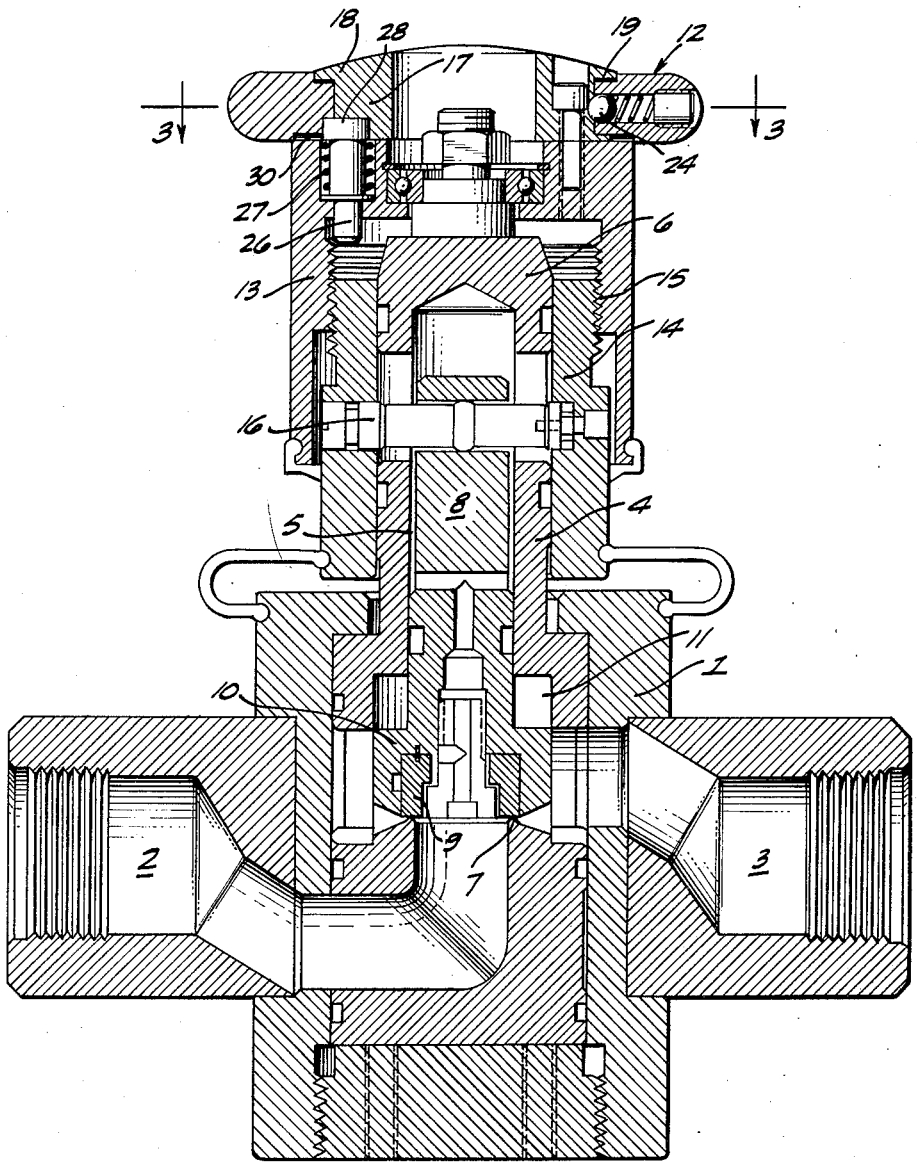
FIGURE 1 is a longitudinal sectional view of my clutch hand wheel positioned on a valve.

My hand wheel construction is particularly applicable to high pressure globe valves, although other types of valves may also employ this construction. For purposes of illustration I will describe hereafter a globe valve in which the numeral 1 indicates the body of the valve, and which has an intake port 2 and an outlet port 3. A cylinder 4 is fixedly mounted in the body 1 by a suitable means. The cylinder 4 extends vertically into the body 1 and is formed with a vertical bore 5. This bore is open at the bottom and closed at the top by the transverse wall 6. A seat 7 is provided in the body 1 and surrounds the intake 2 of the valve. A valve stem 8 is positioned in the bore 5 of the cylinder 4 and is movable vertically in this bore. A soft seat 9 is mounted in the enlarged head 10 on the lower end of the stem 8, and this head has a limited vertical movement within the enlarged bore 11 in the lower end of the cylinder 4.

To move the stem 8 vertically for the purpose of raising or lowering the head 10 relative to its seat 7, I provide a hand wheel 12 which is rotatably mounted at the upper end of the cylinder 4. An apron 13 extends downwardly from the hand wheel 12 and this apron is threaded onto the sleeve 14 which surrounds the cylinder 4. The threads 15 couple the apron 13 and the sleeve 14 so that the sleeve will move vertically on the cylinder 4 when the apron 13 is rotated by the hand wheel 12. A wrist pin 16 extends through the sleeve 14 and through the upper end of the stem 8, thus connecting the stem to the sleeve and moving the valve seat 9 vertically to its open and closed positions.

A plug 17 is positioned within the hand wheel 12 and this plug is formed with a shoulder 18 which extends partly over the inner edge of the hand wheel 12. The hand wheel 12 is formed as an annulus and surrounds the plug 17 as shown. A friction ring 19 is positioned between the shoulder 18 and the top of the hand wheel 12. A second friction ring 20 is positioned between the bottom of the hand wheel 12 and the apron 13. One or more studs 21 extend through the plug 17 and into the apron 13, thus coupling these two members, and when the stud 21 is tightened the friction rings 19 and 20 will be pressed against the hand wheel 12, thus frictionally connecting the hand wheel and the apron 13 in the nature of a driving clutch. To further couple the hand wheel 12 to the plug 17 and the apron 13, I provide a unidirectional clutch construction best shown in FIGURE 3. The plug 17 is provided with a plurality of circumferentially spaced tapered slots 22, which slots terminate at one end in a shoulder 23. One or more spring detents 24 extend radially through the hand wheel 12 and engage the slots 22. In closing position the hand wheel 12 rotates in the direction of the arrow 25 and, therefore, when a pressure is reached which will compress the detents 24 these detents will slide out of the slots 22 without rotating the plug 17 and the apron 13. In the opposite direction of rotation of the hand wheel 12, that is in opening position of the valve, the spring detents 24 will engage the shoulders 23, thus permitting a somewhat greater force which may be applied to the hand wheel 12 in order to unseat the valve under conditions where the valve seat 9 may be stuck somewhat and, therefore, a slightly greater force might be required to unseat the valve than is required in seating the valve.

It is desirable that the hand wheel 12 shall be free to utilize the clutching construction previously described when the seat 9 is about to engage the seat 7, that is, during the closing movement of the valve. When the valve is in full open position, and for approximately one-half of its movement towards closed position, the hand wheel 12 may be directly coupled to the plug 17 and the apron 13 without any clutch action. For this purpose I provide a pin 26 which is pushed downwardly by the spring 27, so that the lower end of the pin will ride on top of the sleeve 14 in the raised or uppermost position of the sleeve. As the sleeve 14 continues to move upwardly (during the opening position of the valve) the upper end of this sleeve will engage the pin 26 and push the upper end of the pin into the complementary recess 28 in the plug 17 and the hand wheel 12. Thus in the raised position of the pin 26 it will couple the hand wheel 12, the plug 17, thus causing these two parts to rotate in unison and without any clutching action. As soon as the sleeve 14 has moved downwardly (for approximately one-half of its stroke) the pin 26 will have moved out of the recess 28, and thereafter the hand wheel 12 and the plug 17 are coupled by the clutch construction previously described. Therefore, when starting to close the valve from its completely open position no clutch action will connect the hand wheel 12 and the valve actuating mechanism, since the valve might be somewhat stuck when it remains in a fully open position for a considerable length of time. As the valve head 10 approaches its closed position, and when the soft seat 9 actually engages its seat, then the clutch structure is operative so that a limited amount of force is applied to the seat 9 in closing the same, and to prevent injury to the soft seat. The detents 24 thus prevent excessive tightening of the valve in closed position, since the hand wheel 12 will slip under pressures above the safe amount.

*In Operation*

Assuming that the valve head 10 is in its uppermost position in the counterbore 11 with the sleeve 14 pressing the pin 26 upwardly into the complementary recesses 28. Thus the hand wheel 12 is fixedly coupled to the plug 17 and the apron 13. In this position higher torques can be applied to the hand wheel 12 for the purpose of starting the valve towards its closed position. When the head 10 has travelled downwardly approximately one-half of its full travel, the spring 27 will force the pin 26 out of the recesses 28 and thereafter the clutch construction between the hand wheel 12 and the plug 17 will be operative. When the soft seat 9 reaches its seated position, excessive torque on the hand wheel 12 is prevented by the spring detents 24, which will move out of the slots 22 when torque greater than the allowable is exerted on the hand wheel 12. To start the seat 9 off of its seated position, that is, when the hand wheel 12 is moved in the opposite direction from the closing position, then the spring detents 24 will engage the shoulders 23 so that there is a positive connection between the hand wheel 12, the plug 17, and the apron 13 to accomplish the unseating movement of the stem 8.

Having described my invention, I claim:

1. In a globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, threaded means connecting the sleeve and the hand wheel, said threaded means and hand wheel being rotatably mounted on the cylinder whereby rotation of the hand wheel will motivate the pin to raise or lower the stem, and clutch means arranged between the hand wheel and said threaded means.

2. A globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron.

3. A globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron, said clutch means including a spring detent, said apron having recesses therein to receive the spring detent.

4. A globe valve having a cylinder projecting from the body thereof, and a seat in said body, a stem extending into the cylinder, a soft seat on the stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron, a friction ring positioned between the hand wheel and the apron.

5. A globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron, said clutch means including a spring detent, said apron having recesses therein to receive the spring detent, a friction ring positioned between the hand wheel and the apron.

6. A globe valve having a cylinder projecting from the body thereof, and a seat in said body, a stem extending into the cylinder, a soft seat on the stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron, a pin reciprocally mounted in the apron, one end of said pin being engageable with the sleeve in one position of the parts, spring means engaging the pin to press the pin towards the sleeve, said hand wheel and apron having cooperating recesses therein into which one end of said pin extends in one position of the parts.

7. A globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron, said clutch means including a spring detent, said apron having recesses therein to receive the spring detent, a pin reciprocally mounted in the apron, one end of said pin being engageable with the sleeve in one position of the parts, spring means engaging the pin to press the pin towards the sleeve, said hand wheel and apron having cooperating recesses therein into which one end of said pin extends in one position of the parts.

8. A globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, an apron depending from the hand wheel, interconnecting threads on the apron and sleeve, said apron and hand wheel being rotatably mounted on the cylinder whereby rotation of the hand wheel will motivate the pin to raise or lower the stem, and clutch means arranged between the hand wheel and said apron, said clutch means including a spring detent, said apron having recesses therein to receive the spring detent, a friction ring positioned between the hand wheel and the apron, a pin reciprocally mounted in the apron, one end of said pin being engageable with the sleeve in one position of the parts, spring means engaging the pin to press the pin towards the sleeve, said hand wheel and apron having cooperating recesses therein into which one end of said pin extends in one position of the parts.

9. In a globe valve having a cylinder projecting from the body thereof, a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, threaded means connecting the sleeve and the hand wheel, said threaded means and hand wheel being rotatably mounted on the cylinder whereby rotation of the hand wheel will motivate the pin to raise or lower the stem, a plug positioned within the hand wheel, an apron depending from the plug and arranged below the hand wheel, means fixedly connecting the plug and the apron, spring detents in the hand wheel, said plug having slots in the side thereof to receive the spring detent.

10. In a globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, threaded means connecting the sleeve and the hand wheel, said threaded means and hand wheel being rotatably mounted on the cylinder whereby rotation of the hand wheel will motivate the pin to raise or lower the stem, a plug positioned within the hand wheel, an apron depending from the plug and arranged below the hand wheel, means fixedly connecting the plug and the apron, spring detents in the hand wheel, said plug having slots in the side thereof to receive the spring detent, and a friction ring positioned between the hand wheel and the apron.

11. In a globe valve having a cylinder projecting from the body thereof, and a seat in said body, a stem extending into the cylinder, a soft seat on said stem, said soft seat resting on the first named seat in one position of the parts, a hand wheel, a pin extending through the stem and into the cylinder, said pin having a limited vertical movement in the cylinder, a sleeve surrounding the cylinder, said pin being seated in the sleeve, threaded means connecting the sleeve and the hand wheel, said threaded means and hand wheel being rotatably mounted on the cylinder whereby rotation of the hand wheel will motivate the pin to raise or lower the stem, a plug positioned within the hand wheel, an apron depending from the plug and arranged below the hand wheel, means fixedly connecting the plug and the apron, spring detents in the hand wheel, said plug having slots in the side thereof to receive the spring detent, a pin reciprocally mounted in the apron, one end of the pin engaging the sleeve in one position of the parts, spring means engaging the pin to urge the pin towards the sleeve, said hand wheel and plug having cooperating recesses therein, one end of said pin extending into the cooperating recesses in one position of the parts.

References Cited in the file of this patent

UNITED STATES PATENTS

| | | |
|---|---|---|
| 2,608,377 | Streun | Aug. 26, 1952 |
| 2,831,648 | Meyer | Apr. 22, 1958 |
| 2,881,602 | Baker | Apr. 14, 1959 |

FOREIGN PATENTS

| | | |
|---|---|---|
| 1,109,246 | France | Sept. 21, 1955 |
| 1,162,263 | France | Apr. 8, 1958 |